United States Patent Office 3,334,105
Patented Aug. 1, 1967

3,334,105
CARBOXYLIC ACIDS SUBSTITUTED IN THE ALPHA-POSITION BY AT LEAST ONE AMINOHETEROCYCLIC, AND PROCESSES FOR THE PREPARATION THEREOF
Etienne Szarvasi, Lyon, France, assignor to Lipha, Lyonnaise Industrielle Pharmaceutique
No Drawing. Filed July 11, 1963, Ser. No. 294,232
Claims priority, application France, Dec. 4, 1962, 917,497
6 Claims. (Cl. 260—294)

The present invention relates to new carboxylic acids which are substituted in the alpha-position by at least one cyclic radical, and to the processes for the preparation thereof.

Certain substituted aliphatic acids comprising a substituent constituted by a 1-naphthyl or 1-naphthylmethyl radical and either another substituent formed by a furyl or tetrahydrofuryl radical, or a low olefinic or acetylenic chain, have formed the subject of French Patent No. 1,289,597 of February 23, 1961, its first certificate of addition No. 80,103 of April 28, 1961, and of the application for second certificate of addition of January 23, 1962, in the name of the applicant.

The compounds according to the invention differ therefrom in that the second substituent referred to is a thienyl, tetrahydropyrannyl, pyridyl, pyrrolidino, piperidino radical or a higher olefinic chain.

The new compounds of the invention are formed by the alpha-substituted carboxylic acids of the general formula

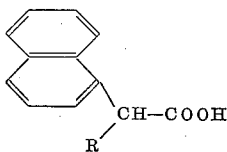

mula in which R is a member of the group formed by the thienyl, methyl-tetrahydropyrannyl, methyl-pyridyl, ethyl pyrrolidino, ethyl-piperidino and undecenyl radicals, in the free state or in the form of their salts, and these acids are more especially alpha-(1-naphthyl)-beta-(2-thienyl)-propionic acid, alpha-(1-naphthyl)-beta-(2-tetrahydropyrannyl) - propionic acid, alpha - (1-naphthyl)-beta-(2-pyridyl)-propionic acid, alpha-(1-naphthyl)-beta-(3-pyridyl)-propionic acid, alpha-(1-naphthyl)-beta-(4-pyridyl)-propionic acid, gamma - pyrrolidino - N - [alpha-(1-naphthyl)-butyric]acid, gamma-piperidino-N-[alpha-(1-naphthyl) - butyric]acid, alpha-(1-naphthyl)-delta-tridecen-12-oic acid.

These acids can be prepared in accordance with the invention by hydrolysing the alpha-substituted nitriles of the formula

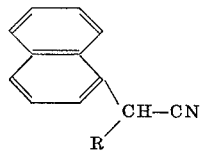

in which R has the same meaning as in the foregoing, by an alkali in the presence of an alcohol, preferably benzyl alcohol.

The acids of amino character are isolated in the form of potassium salts. It is also possible to obtain the free acids from these salts.

The above nitriles are preferably obtained by treating alpha-(1-naphthyl)-acetonitrile with an alkali agent, for example sodium amide, then condensation of the sodium derivative thus obtained with the halide of the general formula RX. These same nitriles can be obtained by condensing the radical corresponding to R with acetonitrile and causing this compound to react with a halonaphthalene. These nitriles are new compounds and for this reason they form part of the invention.

The acids of the invention and their salts have hypocholesteremic properties, the alpha-(1-naphthyl)-beta-(2-thienyl)-propionic acid having an interesting activity in this sphere, and the new acids are also active as anti-spasmodic and anti-histaminic compounds. Nevertheless, the compounds according to the invention are particularly valuable as anti-inflammatory and analgesic compounds; it is possible for this activity to be utilised with advantage in the absence of any inflammation.

The anti-inflammatory activity is determined in several ways, particularly by measuring the inhibition of the edema of the paw of a rat, caused by ovalbumin, formol, or carrageenin, by measuring the inhibition of the erythema of a guinea pig caused by ultra-violet rays. The comparison products used in these tests are acetyl salicylic acid (aspirin), in the edema due to ovalbumin, and 1,2-diphenyl-3,5-dioxo-n-butyl-4-pyrazolidine or carrageenin in the edema due to formol.

The analgesic tests are carried out according to Jacob by the heating plate method.

The behaviour of the potassium alpha-(1-naphthyl)-delta-tridecen-12-oate in these various tests is quite outstanding.

In the edema due to ovalbumin, with an equitoxic dose, the same protection is obtained as with aspirin. In the edema due to formol, the dose of 100 mg./kg. per os ensures the same protection as an identical dose of 1,2-diphenyl - 3,5 - dioxo - n-butyl-4-pyrazolidine. In the erythema due to ultra-violet rays, the ratio between the lethal dose and the effective dose is 6.

In the analgesic test, the dose of 80 mg./kg. administered intraperitoneally assures the protection of the animals for 90 minutes.

The dose of 150 mg./kg., injected intraperitoneally into rabbits, causes the lowering of the temperature of the animals by 1 to 2° C. The compound is antipyretic as regards the fever of the rabbit caused by intravenous injection of diluted anti-typhoid vaccine.

The coefficient of anti-inflammatory activity of the comparison products was fixed arbitrarily at 100, and the coefficients of the other compounds of the invention represent the ratio of their activity with that of the comparison product.

Sodium alpha - (1 - naphthyl) - beta - (2 - thienyl)-propionate shows a coefficient of 69 in the test for the inhibition of the edema of the paw of a rat caused by formol. The sodium alpha-(1-naphthyl)-beta-(2-tetrahydropyrannyl)-propionate has an activity coefficient of 23 in the test concerned with the edema due to formol. Potassium alpha - (1 - naphthyl) - beta - (2 - pyridyl)-propionate has an activity coefficient of 74 in the test of edema due to ovalbumin and of 110 in the test of edema due to formol. The sodium gamma-pyrrolidino-N[alhpa-(1 - naphthyl) - butyrate] semihydrate has an activity coefficient of 41 in connection with edema due to ovalbumin. The potassium gamma-piperidino-N[alpha-(1-naphthyl)-butyrate] shows an activity equal to that of carrageenin and of 3,5-dioxo-n-butyl-4-pyrazolidine in the edema due to formol, and a coefficient of 64 relatively to aspirin in the edema due to ovalbumin.

The preparation and the physical properties of various compounds according to the invention are hereinafter described by way of non-limitative examples.

Example 1.—Alpha-(1-naphthyl)-beta-(2-thienyl)-propionitrile

Empirical formula: $C_{17}H_{13}NS$

Molecular weight: M=263.33

Developed formula

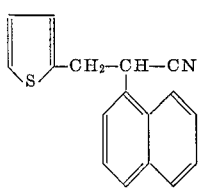

220 cc. of anhydrous ether, 21 g. (0.5 mol) of 90% sodium amide and 83.5 g. (0.5 mol) of alpha-(1-naphthyl)-acetonitrile, are placed in a dry apparatus and then heated for 1 hour under reflux. 66 g. (0.6 mol) of 2-chloromethyl thiophene dissolved in 66 cc. of dry ether are introduced dropwise within 50 minutes by means of a dropping funnel into the cooled mixture. After heating under reflux for 6 hours, the product is carefully poured into water and acidified with hydrochloric acid. By distillation, there are obtained 95 g. of yellow oil with a particular odour, distilling at 184 to 185° C. (1.33 millibars). Yield 72% (theoretical quantity 131.5 g.).

The product has the following constants: Boiling point: B.P.$_{0.77-0.79}$ $_{millibar}$ = 179–181° C. Refractive index:

$$n_d^{21} = 1.6425$$

Analysis by weight—Calculated: C, 77.54%; H, 4.97%; N, 5.32%; S, 12.17%. Found: C, 77.67%; H, 5.02%; N, 5.34%; S, 11.65%.

*Example 2.—Alpha-(1-naphthyl)-beta-(2-thienyl)-propionic acid*

$C_{17}H_{14}O_2S$    (M=282.34)

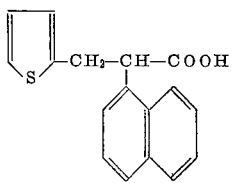

77 g. (1.37 mols) of caustic potash in 6700 cc. of benzyl alcohol and 347 g. (1.32 mols) of alpha-(1-naphthyl)-beta-(2-thienyl)-propionitrile are heated under reflux for 15 hours.

After evaporating the benzyl alcohol in vacuo, the potassium salt is taken up in water. The mother liquors are acidified with hydrochloric acid to the point of Congo acidity and then extracted with benzene. The evaporation in vacuo of the benzene and of the benzyl alcohol yielded 362 g. of viscous residue, which is transferred while still hot into a beaker and diluted with 360 cc. of ethyl acetate, in which it crystallises after standing overnight in a refrigerator, yielding:

1st fraction—73.5 g. of white crystals, with a melting point 97–98° C. (heating stage microscope);
2nd fraction—184 g. of yellow crystals;
3rd fraction—52 g. of yellow crystals.

A total of 308.5 g. of crystalline product is obtained, the yield being 83% (theoretical quantity=372 g.).

The product, recrystallised from ethyl acetate, is analytically pure and exists in the form of slightly yellowish, white crystals with a melting point=97–99° C., acidity index 206 (theoretical index 198).

The slightly yellowish white crystals of its sodium salt have a melting point of 228–230° C. (heating stage microscope) and are slightly sublimed towards 170° C.

Analysis by weight of acid—Calculated: C, 72.33%; H, 4.99%; S, 11.36%. Found: C, 72.34%; H, 4.85%; S, 10.67%.

*Example 3.—Alpha-(1-naphthyl)-beta-(2-tetrahydropyrannyl)-propionitrile*

$C_{18}H_{19}NO$    (M=265.33)

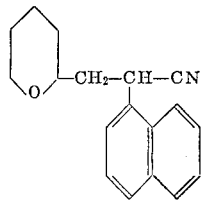

21. g. of 90% sodium amide (0.5 mol of NaNH$_2$) in 220 cc. of dry ether are reacted, as in Example 1, with 83.5 g. (0.5 mol) of alpha-(1-napthyl)-acetonitrile and 89.5 g. (0.5 mol) of 2-bromomethyl tetrahydropyran dissolved in 90 cc. of dry ether. The usual treatment yields 93 g. of a honey yellow viscous liquid with a boiling point of 179–181° C. (at 1.33 millibars). Yield: 76% (theoretical quantity=122 g.).

The redistilled product has the following constants:
Boiling point: B.P.$_{0.93}$ $_{millibar}$=163–164° C.
Refractive index: $n_d^{26}$=1.583.

The product is slowly solidified at ambient temperature and after recrystallization from a mixture of alcohol and hexane, the crystals which are obtained have a melting point of 61–63° C. (heating stage).

Analysis by weight—Calculated: C, 81.49%; H, 7.21%; N, 5.28%. Found: C, 81.53%; H, 7.27%; N, 5.39%.

*Example 4.—Alpha-(1-naphthyl)-beta-(2-tetrahydropyrannyl)-propionic acid*

$C_{18}H_{20}O_3$    (M=284.34)

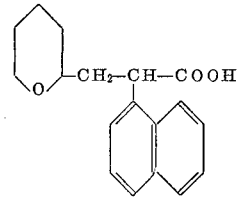

25.5 g. (0.448 mol+10%) of caustic potash in 2000 cc. of benzyl alcohol and 107 g. (0.448 mol) of alpha-(1 - naphthyl)-beta-(2-tetrahydropyrannyl)-propionitrile are heated under reflux for 15 hours.

The crude product of the reaction is treated in the usual manner. The evaporation in vacuo of the extraction benzene, of the benzyl alcohol entrained into the solvent and finally of the dibenzyl ether formed during the reaction yields 76.5 g. of viscous residue. This residue is dissolved while still hot in 76 cc. of ethyl acetate and is crystallised by cooling, thereby yielding 76.5 g. of crude product. Yield: 66.6% (theoretical quantity=115 g.).

The product is obtained in the form of slightly coloured crystals with a melting point of 107–109° C. (heating stage). After being recrystallised twice from ethyl acetate, white crystals are obtained which have a melting point of 111–112° C. (heating stage) and an acidity index of 201 (theoretical index 195).

It is also possible for the crude product to be distilled before being recrystallised and the product distils at 214–216° C. (at 1.33–2 millibars).

The sodium salt is very hygroscopic.

Analysis by weight of the acid—Calculated: C, 76.03%; H, 7.09%. Found: C, 75.94%; H, 6.74%.

*Example 5.—Alpha-(1-naphthyl)-beta-(2-pyridyl)-propionitrile*

Empirical formula: $C_{18}H_{14}N_2$

Molecular weight: M=258.31

Developed formula

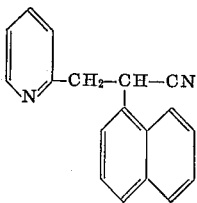

220 cc. of anhydrous ether, 22.2 g. of approximately 90% sodium amide (0.476 mol of NaNH$_2$) and 80 g. (0.478 mol) of alpha-1-naphthyl)-acetonitrile are placed in a thoroughly dried flask equipped with a mechanical stirrer device and a reflux condenser. The mixture is heated under reflux for one hour and then there are added 22.2 g. (0.476 mol) of 90% sodium amide and 74 g. (0.476 mol) of chloromethyl-2-pyridine hydrochloride. After heating under reflux for 6 hours, the reddish reaction mixture is poured into water: after extraction with ether and drying the ethereal extract over anhydrous sodium sulphate, there are obtained by distillation 78 g. of orange viscous liquid which becomes greenish and has a pyridine odour, this liquid distilling at 199–202° C. (under 2.72 millibars). Yield: 63.5% (theoretical quantity 123 g.).

With the second distillation, the alpha-(1-naphthyl)-beta-(2-pyridyl)-propionitrile has a boiling point (under less than 1.36 millibars) of 187–189° C.

Analysis by weight—Calculated: C, 83.70%; H, 5.46%; N, 10.85%. Found: C, 83.92%; H, 5.49%; N, 10.42%.

*Example 6.—Potassium alpha-(1-naphthyl)-beta-(2-pyridyl)-propionate*

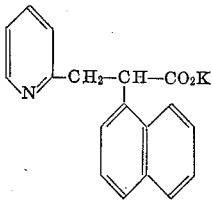

9.5 g. (0.15 mol+10% excess) of caustic potash in 585 cc. of benzyl alcohol and 39 g. (0.15 mol) of alpha-(1-naphthyl)-beta-(2-pyridyl)-propionitrile are heated under reflux for 15 hours. The benzyl alcohol is evaporated in vacuo as completely as possible, the walls of the flask being heated at the end very gently in a flame. The yellow residue is rinsed in a beaker by means of ethyl acetate. After hydroextraction and drying in vacuo, 36 g. of yellow crystals are obtained. Yield: 76% (theoretical quantity 47.5 g.). After recrystallisation from 2000 cc. of ethyl alcohol, white crystals are obtained with a melting point of 317° C. (with capillary tube), with decomposition.

Analysis by weight—Calculated: N, 4.44%. Found: N, 4.36%, 4.63%.

In most of the examples, the acids forming the subject of the present invention are isolated in the form of a potassium salt. It is also possible to obtain the free acids from these salts. The following example describes the process employed in the case of alpha-(1-naphthyl)-beta-(2-pyridyl) propionic acid.

*Example 7.—Alpha-(1-naphthyl)-beta-(2pyridyl)-propionic acid*

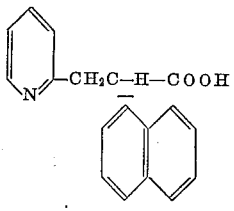

17.75 g. (0.06 mol) of potassium alpha-(1-naphthyl)-beta-(2-pyridyl)-propionate are dissolved in 10 cc. of crystallisable acetic acid and then the solution obtained is heated to 40° C. while stirring for 7 hours and then the acetic acid is evaporated in vacuo. The residue which is obtained is recrystallised from 750 cc. of methanol and leads to the formation of 12.5 g. of white crystals of the melting point 173° C. (capillary tube). Yield: 90% (theoretical quantity=13.8 g.).

After recrystallisation from methanol, the product is analytically pure and melts at 177–178° C., with decomposition (capillary tube).

Analysis by weight—Calculated: C, 77.95%; H, 5.45%; N, 5.05%. Found: C, 77.51%; H, 5.55%; N, 5.02% and 5.09%.

By concentrating the methanolic solution, there are obtained 6.3 g. of acid potassium acetate, M.P.=143–145° C.

*Example 8.—Alpha-(1-naphthyl)-beta-(3-pyridyl)-propionitrile*

$C_{18}H_{14}N_2$ (M=258.31)

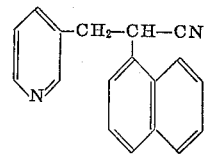

37 g. (0.238 mol) of 3-chloromethyl pyridine hydrochloride are treated according to Example 5 with the stoichiometric quantity of alpha-(1-naphthyl)-acetonitrile. The usual treatment, followed by distillation, yields 28.6 g. of vitreous yellow product which distils at 206–209° C. at 2.04 millibars. The yield is 46.5% (theoretical quantity=61.5 g.). With the second distillation, the product has a boiling point, B.P.$_{1.36\ \text{millibars}}$=189–190° C. After having stood for a long time at ambient temperature and after being repeatedly scratched with a glass rod, the product is transformed into a clear yellow solid mass with a melting point of 45–47° C. (heating stage).

Analysis by weight—Calculated: C, 83.70%; H, 5.46%; N, 10.85%. Found: C, 82.33%; H, 5.67%; N, 10.84%.

*Example 9.—Potassium alpha-(1-naphthyl)-beta-(3-pyridyl)-propionate*

$C_{18}H_{14}NO_2K$ (M=315.39)

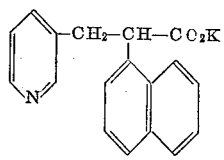

In accordance with the conditions of Example 6, 19.7 g. (0.076 mol) of alpha-(1-naphthyl)-beta-(3-pyridyl)-propionitrile are treated with 4.5 g. (0.076 mol+10% excess) of caustic potash in 340 cc. of benzyl alcohol.

The coloured pasty residue obtained after evaporating the benzyl alcohol in vacuo is dispersed beneath a layer of ether. After hydroextraction and drying in vacuo, there are obtained 20 g. of yellow crystals with a melting point of 198–200° C. (capillary tube). The yield is 83.5% (theoretical quantity=24 g.).

20 g. of crude product as obtained above are recrystallised by dissolving in 60 cc. of boiling alcohol. The first fraction of 0.8 is inorganic. The filtrate, after concentration, has added thereto a sufficient quantity of ether to cause the appearance of clouding. The purified product quickly crystallises in a refrigerator. Slightly hygroscopic white crystals are obtained with a melting point of 222–224° C. (capillary tube).

Analysis by weight—Calculated: N, 4.44%. Found: N, 4.45%.

*Example 10.—Alpha-(1-naphthyl)-beta-(4-pyridyl)-propionitrile*

$C_{18}H_{14}N_2$    (M=258.31)

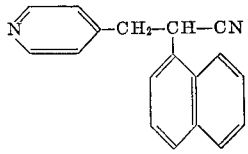

The operation is carried out under the conditions and with the quantities identical to those of Example 5. In the present case, the reacting product is 4-chloromethyl pyridine hydrochloride.

The crude product of the reaction, poured into water, solidifies and the ethereal layer, after evaporation of the solvent, only provides resins. The solid originating from the treatment with water is hydroextracted and dried in air.

There are obtained 64 g. of green crystals with a melting point of 108–112° C. Yield: 52% (theoretical quantity=123 g.).

The product can be used in this form for subsequent reactions. An analytical sample is prepared by recrystallising twice from ethyl acetate; yellow crystals melting at 118–119° C. are obtained (heating stage microscope). It is also possible to distil the crude product and then to recrystallise it.

The redistilled product has a boiling point:

B.P.$_{0.54\ \text{millibar}}$=190–191° C.
B.P.$_{1.36\ \text{millibar}}$=206–207° C.

Analysis by weight—Calculated: C, 83.70 percent; H, 5.46 percent; N, 10.85 percent. Found: C, 83.59 percent; H, 5.58 percent; N, 10.68 percent.

*Example 11.—Potassium alpha-(1-naphthyl)-beta-(4-pyridyl)-propionate*

$C_{18}H_{14}NO_2K$    (M=315.19)

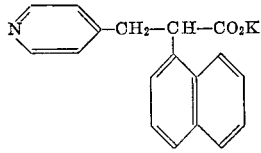

12.1 g. (0.196 mol+10% excess) of caustic potash are treated according to Example 6 in 860 cc. of benzyl alcohol and 50 g. (0.194 mol) of alpha-(1-naphthyl)-beta-(4-pyridyl)-propionitrile.

After evaporating the benzyl alcohol, the pasty product, dispersed beneath a layer of ether, is slowly solidified. After hydroextraction and drying, there are obtained 54.4 g. of beige solid. Yield: 89% (theoretical quantity=61 g). The purification of this solid is effected by dissolving in 200 cc. of boiling ethyl alcohol. The first fraction formed by impurities is discarded. The filtrate, to which ether is added, yields the expected product in several fractions. It is dried at 140° C. to constant weight and the melting point of the solid, once purified, is 207–209° C. (capillary tube).

After fresh purification and drying at 140° C., the potassium alpha-(1-napthyl)-beta-(4-pyridyl)-propionate melts at 211–212.5° C. (capillary tube).

Analysis by weight—Calculated: C, 68.57 percent; H, 4.47 percent; N, 4.44 percent. Found: C, 67.83, 68.20 percent; H, 4.72, 4.82 percent; N, 4.49, 4.13 percent.

*Example 12.—Gamma-pyrrolidino-N-alpha-(1-naphthyl)-butyronitrile*

Empirical formula: $C_{18}H_{20}N_2$
Molecular Weight: M=264.36

Developed formula

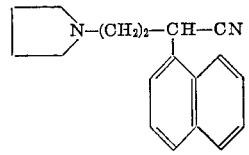

110 cc. of anhydrous ether, 11.1 g. of approximately 98% sodium amide (0.238 mol of $NaNH_2$) and 37.5 g. (0.225 mol) of alpha-(1-naphthyl)-acetonitrile are placed in a dry apparatus and then heated for 1 hour under reflux.

After cooling, 30 g. (0.225 mol) of N-(beta-chlorethyl)-pyrrolidine in 30 cc. of ether are introduced dropwise while cooling externally. The addition of each drop of the halogenated derivative causes a violent reaction. The originally greenish mixture becomes brown. The period required for the addition is 25 minutes. After heating under reflux for 6 hours, the product is carefully poured into water and acidified with hydrochloric acid. By distillation, there are obtained 44.6 g. of an oily, clear yellow liquid having an amine odour, this distilling at 166–169° C. (at 0.815 millibar). The yield is 75% (theoretical quantity=59.4 g).

The redistilled product is analytically pure and has the following constants:

Boiling point: B.P.$_{0.68\ \text{millibar}}$=162–163° C.
Refractive index: $n_d^{20}$=1.587.

Analysis by weight—Calculated: C, 81.79 percent; H, 7.62 percent; N, 10.60 percent. Found: C, 82.08 percent; H, 7.66 percent; N, 10.78 percent.

*Example 13.—Gamma-pyrrolidino-N-alpha-(1-naphthyl)-potassium butyrate semihydrate*

$C_{18}H_{21}NO_{2.5}K$    (M=330.45)

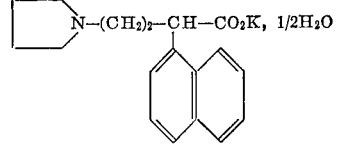

11.2 g. (0.181 mol+10% excess) of caustic potash in 700 cc. of benzyl alcohol and 47.9 g. (0.181 mol) of gamma-pyrrolidino-N-alpha-(1-naphthyl)-butyronitrile are heated under reflux for 15 hours.

The crude potassium salt, obtained after evaporation of the benzyl alcohol in vacuo, is dispersed beneath a layer of ether. A solid white mass is formed, and this is hydroextracted and dried over phosphorus anhydride. There are obtained 43 g. of a white hygroscopic product and the yield is 73.5% (theoretical quantity=58.5 g.).

The crude product obtained as above is dissolved in 400 cc. of ethyl alcohol. The addition of 400 cc. of ether and placing in a refrigerator cause the precipitation of 2.5 g. of mineral white solid (KOH). The highly concentrated filtrate again has added thereto 400 cc. of ether. The white crystals, formed after a night in the refrigerator, are hydroextracted and, after drying over phosphorus anhydride, a hygroscopic product is obtained of which the melting point is 223–225° C. (capillary tube).

Analysis by weight—Calculated: C, 65.43%; H, 6.40%; N, 4.24%. Found: C, 65.66%; H, 6.50%; N, 4.05%.

*Example 14.—Gamma-piperidino-N-alpha-(1-naphthyl)-butyronitrile*

$C_{19}H_{22}N_2$ (M=278.39)

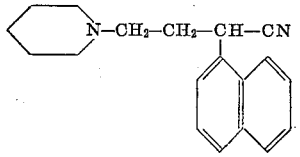

110 cc. of ether, 11.1 g. of approximately 98% sodium amide (0.238 mol of $NaNH_2$), 37.5 g. (0.225 mol) of alpha-(1-naphthyl)-acetonitrile and 34.5 g. (0.227 mol) of N-(beta-chlorethyl)-piperidine are treated according to the conditions of Example 12 in 35 cc. of ether.

The usual treatment yields 48 g. of viscous yellow liquid with an amine odour and a boiling point B.P.$_{0.747\text{ millibar}}$=169–171° C.

The yield is 77% (theoretical quantity=62.5 g.). The redistilled product is analytically pure and has the following constants:
 Boiling point: B.P.$_{0.475\text{ millibar}}$=161–163° C.
 Refractive index: $n_d^{24}$=1.580.
 Analysis by weight—Calculated: C, 82.00%; H, 7.96%; N, 10.07%. Found: C, 82.03%; H, 8.00%; N, 10.07%.

*Example 15.—Gamma-piperidino-N-alpha-(1-naphthyl)-potassium butyrate*

$C_{19}H_{22}NO_2K$ (M=335.47)

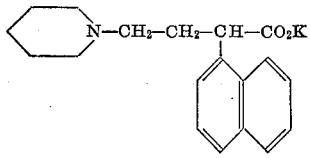

8.4 g. (0.135 mol+10%) of caustic potash in 550 cc. of benzyl alcohol and 37.5 g. (0.135 mol) of piperidino-N-alpha-(1-naphthyl)-butyronitrile are heated under reflux for 15 hours.

After evaporating the benzyl alcohol in vacuo, the potassium salt which is required is obtained in the form of a semi-solid mass. This crude product is dispersed beneath a layer of ether. After hydroextraction and washing with ether, the product is dried in vacuo over phosphorus anhydride and there are obtained 33.7 g. of slightly yellow solid with a melting point of 222–224° C. (capillary tube). The yield is 74.4% (theoretical quantity=45.3 g.).

33.7 g. of the product previously obtained are dissolved in 160 cc. of boiling alcohol. After one night in a refrigerator, 3.2 g. of inorganic product are removed in two fractions. The mother liquors are evaporated to dryness and there are obtained 25.2 g. of slightly yellow solid, which is again purified.

25 g. of product, recrystallised once from the minimum quantity of alcohol, are dissolved to form a syrup and then an excess of ether is added thereto. The initially liquid mixture becomes cloudy and white crystals precipitate. These are hydroextracted after standing overnight in a refrigerator. After drying in vacuo, slightly hygroscopic, white crystals are obtained with a melting point of 228–230° C. (capillary tube).

The last fractions of the recrystallisation are advantageously obtained by evaporating the mother liquors to syrupy consistency and treating them afresh with ether.

Analysis by weight—Calculated: N, 4.17%. Found: N, 4.18%.

*Example 16.—Alpha-(1-naphthyl)-delta-tridecene-12-oic nitrile*

$C_{23}H_{29}N$ (M=319.46)

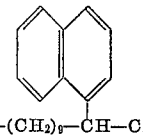

70 cc. of anhydrous ether, 6.7 g. of approximately 90% sodium amide (0.153 mol of $NaNH_2$) and 26 g. (0.154 mol) of alpha-(1-naphthyl)-acetonitrile are placed in a dry apparatus and then heated for 1 hour under reflux. 29 g. (0.153 mol) of 1-chloro-10-delta-undecylene are introduced dropwise by means of a dropping funnel into the cooled mixture. After heating under reflux for 6 hours, the product is carefully poured into water and acidified with hydrochloric acid. By distillation, there are obtained 39 g. of slightly yellow, fluid liquid distilling at 199–200° C. (at 2 millibars). Yield: 79.5% (theoretical quantity=49 g.).

The redistilled product has the following constants:
 Boiling point: B.P.$_{0.51\text{ millibar}}$=181–183° C.
 Boiling point: B.P.$_{0.68\text{ millibar}}$=183–184° C.
 Density: $d_4^{23}$=0.950.
 Refractive index: $n_d^{24}$=1.550.
 Analysis by weight—Calculated: C, 86.48%; H, 9.14%; N, 4.38%. Found: C, 86.41%; H, 8.94; N, 4.58%.

*Example 17.—Alpha-(1-naphthyl)-delta-tridecen-12-oic acid*

$C_{23}H_{30}O_2$ (M=338.47)

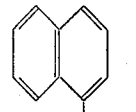

32 g. (0.57 mol) of caustic potash in 1080 cc. of benzyl alcohol and 90 g. (0.28 mol) of alpha-(1-naphthyl)-delta-tridecen-12-oic nitrile are heated under reflux for 15 hours.

The usual treatment provides, after distillation, 64 g. of yellow oil distilling at 232–234° C. at 2 millibars. Yield: 67.5% (theoretical quantity 95 g.)

The redistilled product has the following constants:
 Boiling point: B.P.$_{1.36\text{ millibars}}$=214–215° C.
 Refractive index: $n_d^{22}$=1.554.
 Acidity index: calculated 165, found 160.
 Analysis by weight: Calculated: C, 81.64 percent; H, 8.97 percent. Found: C, 81.74 percent; H, 8.98 percent.

By using the stoichiometric quantities of nitrile and potash for the same period of time, the saponification is incomplete.

The slightly hygroscopic white crystals of the potassium salt of alpha-(1-naphthyl)-delta-tridecen-12-oic acid have a melting point of 162–164° C. (capillary tube).

I claim:
1. An alpha-substituted carboxylic acid of the formula

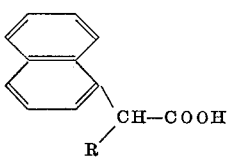

in which R is a member of the group consisting of methyl-pyridyl, ethyl-pyrrolidino and ethyl - piperidino radicals and the salts thereof.

2. The chemical compound α-(1-naphthyl)-β-(2-pyridyl)-propionic acid represented by the formula

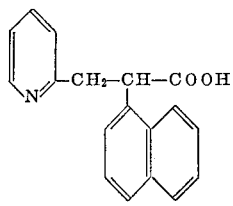

and its salts.

3. The chemical compound α-(1-naphthyl)-β-(3-pyridyl)-propionic acid represented by the formula

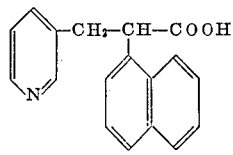

and its salts.

4. The chemical compound α-(1-naphthyl)-β-(4-pyridyl)-propionic acid represented by the formula

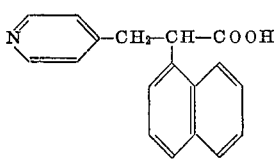

and its salts.

5. The chemical compound α-(1-naphthyl)-γ-(N-pyrrolidino)-butyric acid represented by the formula

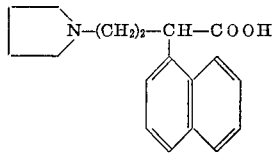

and its salts.

6. The chemical compound α-(1-naphthyl)-γ-(N-piperidino)-butyric acid represented by the formula

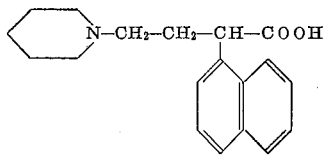

and its salts.

References Cited

UNITED STATES PATENTS

| | | | |
|---|---|---|---|
| 2,507,631 | 5/1950 | Hartmann et al. | 260—294 X |
| 2,508,332 | 5/1950 | Hartmann et al. | 260—293 |
| 2,937,118 | 5/1960 | Haxthausen et al. | 167—65 |
| 3,063,902 | 11/1962 | Gray et al. | 167—65 |
| 3,097,206 | 7/1963 | Zirkle | 260—293.45 |
| 3,128,277 | 4/1964 | Temple | 260—294 X |
| 3,257,420 | 6/1964 | Szarvasi et al. | 260—347.4 |

FOREIGN PATENTS 1,289,597   2/1962   France.

OTHER REFERENCES

Noller, Chem. or Org. Compounds, 2nd ed., 1959, pg. 144 (Saunders Co., Philadelphia), 1957.

Szarvasi et al. Bull Chim. Soc., Ser. 5 (1962), pg. 1343–1354.

Ukita et al., Chemical Abstracts, vol. 46, page 959 (1952).

WALTER A. MODANCE, *Primary Examiner.*

N. S. RIZZO, *Examiner.*

R. L. PRICE, A. D. SPEVACK, *Assistant Examiners.*